US011961440B2

(12) United States Patent
Li et al.

(10) Patent No.: US 11,961,440 B2
(45) Date of Patent: Apr. 16, 2024

(54) METHOD FOR DRIVING DISPLAY DEVICE, AND DISPLAY DEVICE

(71) Applicant: HKC CORPORATION LIMITED, Shenzhen (CN)

(72) Inventors: Zeyao Li, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/878,155

(22) Filed: Aug. 1, 2022

(65) Prior Publication Data

US 2023/0086548 A1 Mar. 23, 2023

(30) Foreign Application Priority Data

Sep. 23, 2021 (CN) ......................... 202111115888.X

(51) Int. Cl.
*G09G 3/20* (2006.01)

(52) U.S. Cl.
CPC ....... *G09G 3/20* (2013.01); *G09G 2310/0254* (2013.01); *G09G 2310/061* (2013.01); *G09G 2320/0233* (2013.01); *G09G 2320/0247* (2013.01); *G09G 2340/0435* (2013.01)

(58) Field of Classification Search
CPC ............. G09G 3/20; G09G 2310/0254; G09G 2310/061; G09G 2320/0233; G09G 2320/0247; G09G 2340/0435
See application file for complete search history.

(56) References Cited

U.S. PATENT DOCUMENTS

| | | | | |
|---|---|---|---|---|
| 2016/0365019 | A1* | 12/2016 | Lee ...................... | G09G 3/3688 |
| 2018/0061356 | A1 | 3/2018 | Tada et al. | |
| 2021/0142758 | A1* | 5/2021 | Koo ..................... | G09G 3/3655 |

FOREIGN PATENT DOCUMENTS

| | | | |
|---|---|---|---|
| CN | 1348159 | A | 5/2002 |
| CN | 101675374 | A | 3/2010 |
| CN | 104376820 | A | 2/2015 |
| CN | 106971694 | A | 7/2017 |
| CN | 107039013 | A | 8/2017 |
| CN | 107452347 | A | 12/2017 |
| CN | 110060642 | A | 7/2019 |
| CN | 111816109 | A | 10/2020 |
| WO | 2013021576 | A1 | 2/2013 |

* cited by examiner

*Primary Examiner* — Robert J Michaud
(74) *Attorney, Agent, or Firm* — Maier & Maier, PLLC

(57) ABSTRACT

A method for driving a display device is provided. The method includes: obtaining a refresh frequency of a current frame image; adjusting a common voltage of all pixels in a second vertical blank interval to control a difference value between a root mean square of voltage differences between common voltages and pixel voltages of the pixels in a first vertical blank interval when a reference frame image is displayed, and a root mean square of voltage differences between common voltages and pixel voltages of the pixels in the second vertical blank interval when a current frame image is displayed to be within a preset-voltage-difference-range, such that the difference in decrease levels of potentials of the pixels at different refresh frequencies are greatly reduced, the screen brightness displayed on the display device at different refresh frequencies tend to be consistent, and a screen flicker phenomenon is further improved.

16 Claims, 5 Drawing Sheets

METHOD FOR DRIVING DISPLAY DEVICE, AND DISPLAY DEVICE

CROSS-REFERENCE TO RELATED APPLICATIONS

Pursuant to 35 U.S.C. § 119 and the Paris Convention Treaty, this application claims the benefit of Chinese patent application No. 202111115888.X filed Sep. 23, 2021 and entitled "driving method, driving device, and display device", the contents of which are incorporated herein by reference in entirety.

TECHNICAL FIELD

The present application relates to the field of display technology, and more particularly to a method for driving a display device, and a display device.

BACKGROUND

With the continuous development of display technology, various types of display devices are published continuously, so that great convenience is brought to people's daily production, life and entertainment. A standard static refresh display device has a fixed refresh frequency, and a phenomenon of screening tearing occurs when a frame frequency of a graphics card is not identical to the refresh frequency of the display device. The refresh frequency of the display device is reduced by boosting a VBI (Vertical Blank Interval), that is, by prolonging a retention time of a voltage of each pixel of the display device when each frame image is displayed by the display device, such that the refresh frequency of the display device and a frame frequency of the graphics card can be synchronized, and a screen tearing phenomenon may be avoided.

However, after pixels are charged, electric leakage will inevitably occur when the pixels hold potentials, and thus decreases of potentials of the pixels are caused, a frame synchronization technology may cause the display device to have different vertical blank intervals at different refresh frequencies of the display device, such that the different decrease levels of the potentials of the pixels are caused, the brightness of an image at different refresh frequencies of the display device are different, and a screen flicker phenomenon may occur in a serious condition.

SUMMARY

In view of this, a method for driving a display device, and a display device are provided in the embodiments of the present application. A difference value between a root mean square of voltage differences between common voltages and pixel voltages of all pixels in a first vertical blank interval when the reference frame is displayed, and a root mean square of voltage differences between common voltages and pixel voltages of the pixels in a second vertical blank interval when the current frame image is displayed is enabled to be within the preset-voltage-difference-range, so that the difference in decrease levels of potentials of the pixels at different refresh frequencies is reduced, and a problem that the frame synchronization technology may cause the display device to have different vertical blank intervals at different refresh frequencies of the display device, such that the decrease levels of the potentials of the pixels are different, brightness of an image are different at different refresh frequencies of the display device, and a screen flicker phenomenon occurs in a serious condition is solved.

A method for driving a display device is provided according to the first aspect of the embodiments of the present application, this method includes:

obtaining a refresh frequency of a current frame image;

adjusting a common voltage of all pixels in a second vertical blank interval to control a difference value between a first voltage difference and a second voltage difference to be within a preset-voltage-difference-range if the refresh frequency of the current frame image is different from a refresh frequency of a reference frame image;

where the first voltage difference is a root mean square of m difference values between m common voltages and m pixel voltages of the pixels obtained at m time points in a first vertical blank interval when the reference frame image is displayed on the display device; the second voltage difference is a root mean square of n difference values between n common voltages and n pixel voltages of the pixels obtained at n time points in the second vertical blank interval when the current frame image is displayed on the display device.

A device for driving the display device is further provided in the second aspect of the embodiments of the present application, this device includes:

an obtaining unit configured to obtain a refresh frequency of a current frame image;

an adjustment unit configured to adjust a common voltage of all pixels in a second vertical blank interval in order that a difference value between a first voltage difference and a second voltage difference is within a preset-voltage-difference-range if the refresh frequency of the current frame image is different from a refresh frequency of a reference frame image;

where the first voltage difference is a root mean square of difference values between common voltages and pixel voltages of the pixels in a first vertical blank interval when the reference frame image is displayed; the second voltage difference is a root mean square of difference values between common voltages and pixel voltages of the pixels in the second vertical blank interval when the current frame image is displayed.

A display device is provided in the third aspect of the embodiments of the present application, the display device includes an array substrate, a memory, a processor and a computer program stored in the memory and executable by the processor, where the array substrate includes a pixel array, the processor is configured to, when executing the computer program, implement steps of the method for driving the display device provided by the first aspect of the embodiments of the present application.

A computer readable storage medium is provided in the fourth aspect of the embodiments of the present application, the computer readable storage medium stores a computer program, that, when executed by a processor, causes the processor to implement the steps of the method for driving the display device provided in the first aspect of the embodiments of the present application.

In the method for driving the display device according to the first aspect of the embodiments of the present application, the refresh frequency of the current frame image is obtained; if the refresh frequency of the current frame image is different from the refresh frequency of the reference frame image, the common voltage of all the pixels in the second vertical blank interval is adjusted, such that the difference value between the root mean square of m difference values between the m common voltages and the m pixel voltages of the pixels obtained at m time points in the first vertical blank interval and the root mean square of n difference values between the n common voltages and n pixel voltages of the pixels obtained at n time points in the second vertical blank interval can be enabled to be within the preset-voltage-difference-range when the reference frame image is displayed, the difference of decrease levels of pixel potentials of the display device at different refresh frequencies may be effectively reduced, so that the brightness of images displayed by the display device at different refresh frequencies tends to be consistent, and the screen flicker phenomenon is further improved.

It may be understood that, regarding the beneficial effects achieved in the second aspect, the third aspect and the fourth aspect, reference can be made to the relevant descriptions in the first aspect, and the details of these beneficial effects in the first aspect, the second aspect, the third aspect and the fourth aspect are not repeatedly described here.

BRIEF DESCRIPTION OF THE DRAWINGS

In order to describe the technical solutions in the embodiments of the present application more clearly, a brief introduction regarding the accompanying drawings that need to be used in describing the embodiments or the prior art is given below; it is obvious that the accompanying figures described below are merely some embodiments of the present application, the person of ordinary skill in the art can also obtain other drawings according to the current drawings without paying creative labor.

DETAILED DESCRIPTION OF THE EMBODIMENTS

Figure 1:
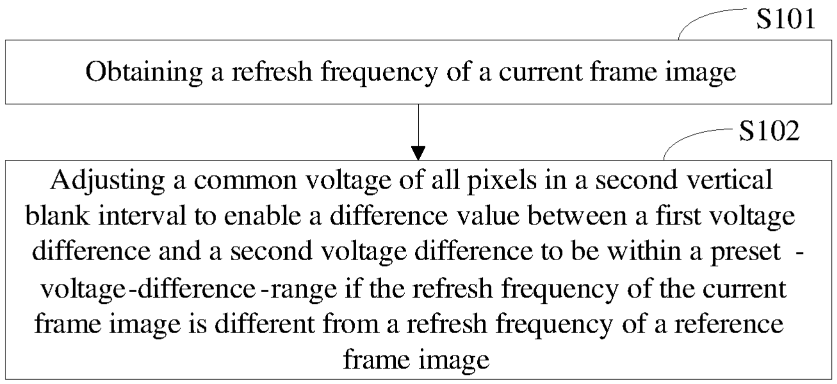
FIG. 1 illustrates a schematic flowchart of a driving method according to a first embodiment of the present application.

In the following descriptions, in order to describe but not intended to limit the present application, concrete details including specific system structure and technique are proposed, so that a comprehensive understanding of the embodiments of the present application is facilitated. However, a person of ordinarily skill in the art should understand that, the present application can also be implemented in some other embodiments from which these concrete details are excluded. In other conditions, detailed explanations of method, circuit, device and system well known to the public are omitted, so that unnecessary details which are disadvantageous to understanding of the description of the present application may be avoided.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should also be understood that, terms used in the description of the present application are for the purpose of describing specific embodiments but not intended to limit the present application. As is used in the description and the annexed claims of the present application, unless other conditions are indicated clearly in the context, otherwise, singular forms of terms such as "a", "one", "the" are intended to include plural forms.

It should be further understood that, terms "and/or" used in the description and the annexed claims of the present application are referred to as any combination of one or a plurality of listed item(s) associated with each other and all possible items, and including these combinations.

As is used in the description and the annexed claims, a term "if" may be interpreted as "when" or "once" or "in response to determination" or "in response to detection". Similarly, terms such as "if it is determined that", or "if it is detected that (a described condition or event)" may be interpreted as "once it is determined" or "in response to the determination" or "once it is detected that (the described condition or event)" or "in response to the detection (the described condition or event)".

Moreover, in the descriptions and the annexed claims of the present application, terms such as "first" and "second", "third" are only intended to be distinguished from each other in description, rather than being interpreted as indicating or implying a relative importance.

The descriptions of "referring to one embodiment" and "referring to some embodiments" as described in the specification of the present application means that a specific feature, structure, or characters which are described with reference to this embodiment are included. In one embodiment or some embodiments of the present application. Thus, the sentences of "In one embodiment", "in some embodiments", "in some other embodiments", "in other embodiments", and the like in this specification are not necessarily referring to the same embodiment, but instead indicate "one or more embodiments instead of all embodiments", unless there is a special emphasis in other manner otherwise. The terms "comprising", "including", "having" and their variations indicate "including but is not limited to", unless there is a special emphasis in other manner otherwise.

First Embodiment

The driving method of the display device provided by the first embodiment of the present application may be performed by a processor of a display device by executing a corresponding computer program, so that when the refresh frequency of the current frame image displayed by the display device is different from the refresh frequency of the reference frame image, a common voltage of all pixels in a second vertical blank interval is adjusted, such that a difference value between a RMS (Root-Mean-Square) of a difference value between the common voltage of all the pixels in a first vertical blank interval and the pixel image and a RMS of a difference value between the common voltage of all the pixels in the second vertical blank interval and the pixel image is enabled to be within a preset-voltage-difference-range, the difference of decrease levels of potentials of the pixels of the display device at different refresh frequencies can be effectively reduced, screen brightness at different refresh frequencies tends to be consistent, and a screen flicker phenomenon is further improved.

As shown in FIG. 1, a method for driving a display device according to the first embodiment of the present application includes step S101 and step S102 listed below;

At step S101, a refresh frequency of a current frame image is obtained.

At step S102, the common voltage of all the pixels in the second vertical blank interval is adjusted, such that a difference value between a first voltage difference and a second voltage difference is enabled to be within a preset-voltage-difference-range;

Where the first voltage difference is a root mean square of difference values between common voltages and pixel voltages of all pixels in the first vertical blank interval when the reference frame image is displayed; the second voltage difference is a root mean square of difference values between common voltages and pixel voltages of the pixels in the second vertical blank interval when the current frame image is displayed.

In one embodiment, when any frame image is displayed on the display device, the display device needs to obtain a refresh frequency of the frame image and compare the refresh frequency with the refresh frequency of the reference frame image, if the refresh frequency of the frame image is different from the refresh frequency of the reference frame image, the common voltage of the pixels in the vertical blank interval needs to be adjusted when this frame image is displayed on the display device. In this embodiment of the present application, for the convenience of description, the current frame image displayed by the display device at the current time is taken as an example, when the reference frame image is displayed by the display device, the vertical blank interval of the display device is defined as the first vertical blank interval, and when the current frame image is displayed by the display device, the vertical blank interval of the display device is defined as the second vertical blank interval, so that when different images are displayed on the display device, the vertical blank intervals of the display device can be better distinguished.

In one embodiment, the reference frame image may either be a previous frame image or be a any frame of a preset image, where the refresh frequency and the vertical blank interval of this image are known. By setting the reference frame image as the previous frame image, such that the brightness of the multi-frame images continuously displayed by the display device may tend to be consistent with the brightness of the first frame image; thus, when the display device displays one multi-frame images corresponding to one image data packet or one video data packet (also referred to as video data stream), the brightness of the multi-frame images corresponding to the same image data packet or the same video data packet tends to be consistent; when multi-frame images corresponding to different image data packets or different video data packets are displayed, if first frame images corresponding to the different image data packets or the different video data packets have the same brightness, the brightness of the multi-frame images corresponding to these different image data packets or the video data packets are also the same; if the first frame images corresponding to the different image data packets or the different video data packets have different brightness, the brightness of the multi-frame images corresponding to the different image data packets or the different video data packets are also different. The reference frame image is set as the preset image, such that the brightness of the multi-frame images continuously displayed by the display device tends to be consistent with the brightness of the preset image; thus, when the multi-frame images corresponding to the different image data packets or the different video data packets (also referred to as the video data streams) are displayed by the display device, the brightness of the multi-frame images corresponding to the image data packets or the video data packets tends to be consistent.

In one embodiment, the refresh frequency of the current frame image may be less than the refresh frequency of the reference frame image, in this condition, the second vertical blank interval is greater than the first vertical blank interval; the refresh frequency of the current frame image may also be greater than the refresh frequency of the reference frame image, in this condition, the second vertical blank interval is smaller than the first vertical blank interval.

Figure 2:
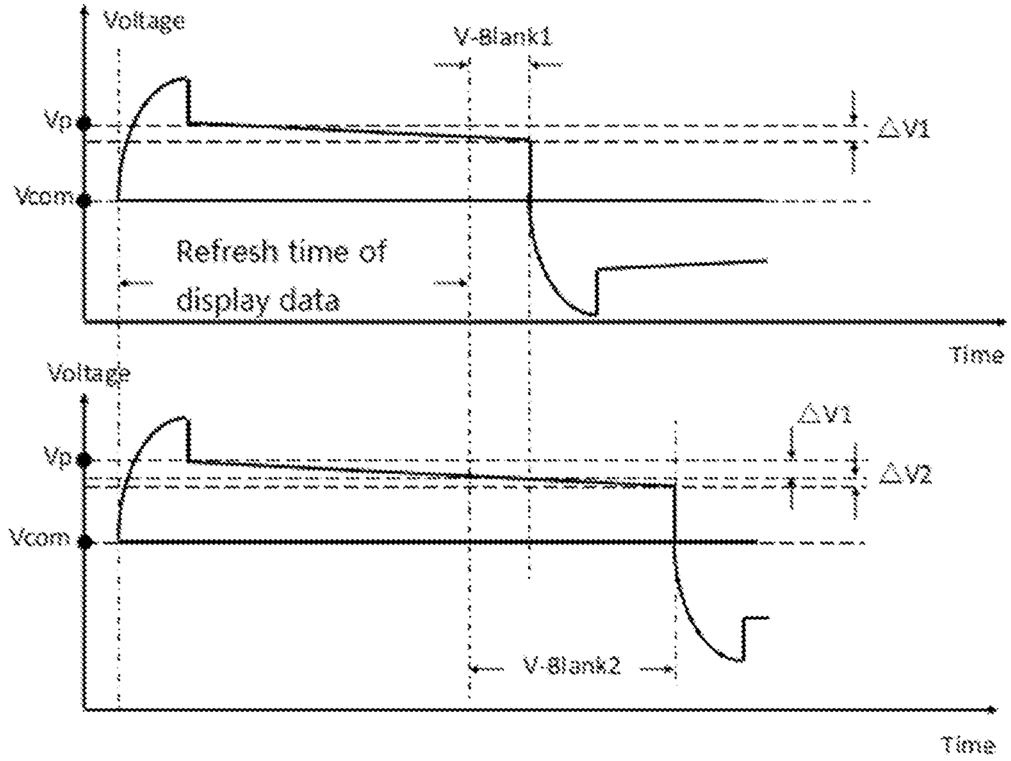
FIG. 2 illustrates a schematic diagram of change of a pixel voltage and a common voltage with time when a reference frame image and a current frame image are displayed by a display device respectively according to the first embodiment of the present application.

As shown in FIG. 2, FIG. 2 exemplarily illustrates a schematic diagram of change of the pixel voltage $V_p$ and the common voltage $V_{com}$ with time if the refresh frequency of the current frame image is less than the refresh frequency of the reference frame image and the second vertical blank interval is greater than the first vertical blank interval, when the reference frame image and the current frame image are displayed by the display device respectively; where V-Blank1 represents the first vertical blank interval, ΔV1 represents a voltage difference between an initial pixel voltage and a pixel voltage at an ending point of the first vertical blank interval, V-Blank 2 represents the second vertical blank interval, and ΔV2 represents a voltage difference between the pixel voltage at the ending point of the first vertical blank interval and the pixel voltage at the ending point of the second vertical blank interval. The initial pixel voltage is a pixel voltage output from a data driving circuit (e.g., a source electrode driver) to the pixels and being used for charging the pixels when the reference frame image is displayed by the display device.

In one embodiment, a method for calculating the root mean square is implemented by:

calculating a summation of squared values of all values obtained in one time duration and obtaining an average value of the summation, and extracting a square root of the average value to obtain a root mean square;

Similarly, a method for calculating the first voltage difference is described below:

When the reference frame image is displayed on the display device, summation of m (i.e, m is an integer greater than 1) difference values (A1, A2, . . . , Am) between m common voltages of all pixels and m pixel voltages obtained at m time points in the first vertical blank interval are obtained. Summation of the difference values is expressed as Σ1=A1+A2+ . . . +Am. Then, the average value of Σ1 is calculated, the average value of Σ1 is expressed as Avg1=Σ1/m=(A1+A2+ . . . +Am)/m, then, square root of Avg1 is calculated to obtain the root mean square (i.e., the first voltage difference) which is expressed as D1=1 Avg1;

The method for calculating the second voltage difference is described below: when the current frame image is displayed on the display device, summation of n (n is an integer greater than 1) difference values (B1, B2, . . . , Bn) of n common voltages of the pixels and n pixel voltages obtained at n time points in the second vertical blank interval is calculated. The summation of the n difference values is expressed as E 2=B1+B2+ . . . +Bn. Then, the average value of Σ2 is calculated, the average value of Σ2 is expressed as Avg2=Σ2/n=(B1+B2+ . . . +Bn)/n. The square root of the average value of Σ2 is calculated to obtain the root mean square (i.e., the second voltage difference) which is expressed as $D2=\sqrt{Avg2}$.

In one embodiment, time intervals between any two adjacent time points in the m time points are equal, the greater the value of M, the more accurate the calculation result of the first voltage difference; similarly, time intervals between any two adjacent time points in the n time points are equal, the greater the value of n, the more accurate the calculation result of the second voltage difference.

In one embodiment, the preset-voltage-difference-range may be set according to actual requirement, the smaller the preset-voltage-difference-range, the more consistent the screen brightness displayed by the display device after adjustment at different refresh frequencies, and the better the improved effect of the screen flicker phenomenon. The preset-voltage-difference-range may also be equivalently replaced by a single ideal value 0, in this condition, the screen brightness displayed by the display device at different refresh frequencies after adjustment are completely consistent, and the screen flicker phenomenon can be completely eliminated.

In one embodiment, the adjustment range of the common voltage is between the initial common voltage and the target common voltage, the voltage difference between the initial common voltage and the target common voltage is equal to a third voltage difference, and the third voltage difference is a voltage difference between the initial pixel voltage and the pixel voltage at the ending point of the second vertical blank interval, that is, the third voltage difference is an amount of change between the pixel voltage at the start time and the pixel voltage at the ending point during the process of displaying the current frame image by the display device.

In one embodiment, based on different methods for adjusting the common voltage, the method for adjusting the common voltage of all pixels in the second vertical blank interval in step S102 may include some approaches listed below:

- the first approach, including: the common voltage of all pixels in the second vertical blank interval is adjusted in a vertical change manner, so that the common voltage changes vertically in the second vertical blank interval;
- the second approach, including: the common voltage of all the pixels in the second vertical blank interval is adjusted in a linear change manner, so that the common voltage changes linearly in the second vertical blank interval;
- the third approach, including: the common voltage of all the pixels in the second vertical blank interval is adjusted in an oscillation change manner, so that the common voltage changes in the oscillation change manner in the second vertical blank interval;

The fourth approach, including: the common voltage of all the pixels in the second vertical blank interval is adjusted in a step change manner, so that the common voltage changes in the step change manner in the second vertical blank interval.

In one embodiment, any one of the four approaches for adjusting the common voltage may be selected according to actual requirement, as an alternative, other voltage adjustment methods may also be used as long as the common voltage changes uniformly between the initial common voltage and the target common voltage. By applying the first approach, the common voltage applied to all the pixels of the display device remains unchanged in the second vertical blank interval, so that a common voltage generation circuit only needs to generate a fixed common voltage in the second vertical blank interval, a voltage adjustment logic of the common voltage generation circuit is simplified, a circuit configuration of the common voltage generation circuit may be simplified, and the cost is saved; furthermore, a computing resource and an execution time of the processor are effectively saved. By applying the second approach, the third approach or the fourth approach, such that the common voltage applied to all pixels of the display device changes uniformly in the second vertical blank interval, the common voltage generation circuit only needs to generate a uniformly changed common voltage according to a certain change rule in the second vertical blank interval, so that the voltage adjustment logic of the common voltage generation circuit is regular, it is easier to implement the circuit configuration of the common voltage generation circuit; furthermore, the computing resource and the execution time of the processor are effectively saved.

In one embodiment, when the current frame image is displayed on the display device, the method for adjusting the common voltage of all pixels is also related with a polarity inversion driving mode of the display device. When the refresh frequency of the current frame image is less than the refresh frequency of the reference frame image, and the second vertical blank interval is greater than the first vertical blank interval, based on different polarity inversion driving modes, the method for adjusting the common voltage of all pixels in the second vertical blank interval in step S102 may include some approaches listed below:

the first approach, including: in a frame-inversion-driving-mode, the common voltage of all the pixels in the second vertical blank interval is reduced if the current frame has a positive polarity; the common voltage of all the pixels in the second vertical blank interval is boosted if the current frame has a negative polarity;

the second approach, including: in a point-inversion-driving-mode, the common voltage of the pixels having the positive polarity in the second vertical blank interval is reduced, and the common voltage of the pixels with the negative polarity in the second vertical blank interval is boosted;

the third approach, including: in a row-inversion-driving-mode, the common voltage of row pixels having the positive polarity in the second vertical blank interval is reduced, and the common voltage of row pixels having the negative polarity in the second vertical blank interval is boosted;

the fourth approach, including: in a column-inversion-driving-mode, the common voltage of column pixels having the positive polarity in the second vertical blank interval is reduced, and the common voltage of column pixels having the negative polarity in the second vertical blank interval is boosted.

When the refresh frequency of the current frame image is greater than the refresh frequency of the reference frame image, and the second vertical blank interval is smaller than the first vertical blank interval, based on different polarity inversion driving modes, the method for adjusting the common voltage of all pixels in the second vertical blank interval in step S102 may include some approached listed below:

the first approach, including: in a frame-inversion-driving-mode, the common voltage of all the pixels in the second vertical blank interval is boosted if the current frame has the positive polarity; the common voltage of all the pixels in the second vertical blank interval is reduced if the current frame has the negative polarity;

the second approach, including: in a point-inversion-driving-mode, the common voltage of the pixels having the positive polarity in the second vertical blank interval is boosted, and the common voltage of the pixels having the negative polarity in the second vertical blank interval is reduced;

the third approach, including: in a row-inversion-driving-mode, the common voltage of row pixels having the positive polarity in the second vertical blank interval is boosted, and the common voltage of row pixels having the negative polarity in the second vertical blank interval is reduced;

the fourth approach, including: in a column-inversion-driving-mode, the common voltage of column pixels having the positive polarity in the second vertical blank interval is boosted, and the common voltage of column pixels having the negative polarity in the second vertical blank interval is reduced;

the fifth approach, including: in a line-one-and-line-two-inversion-driving-mode, the common voltage of the pixels having the positive polarity in the second vertical blank interval is reduced, and the common voltage of the pixels having the negative polarity in the second vertical blank interval is boosted.

In one embodiment, both the row-inversion-driving-mode and the column-inversion-driving-mode can be an N-line inversion driving mode, the N-line inversion driving mode means that the polarities of every N rows (or columns) of pixels are inverted, where N is a positive integer. Due to the approaches for adjusting the common voltage under the aforesaid various polarity inversion driving modes, such that the driving method provided in this embodiment can be applied to a display device using at least one of the polarity inversion driving modes, and there is a broad application range of the display device.

Figure 3:
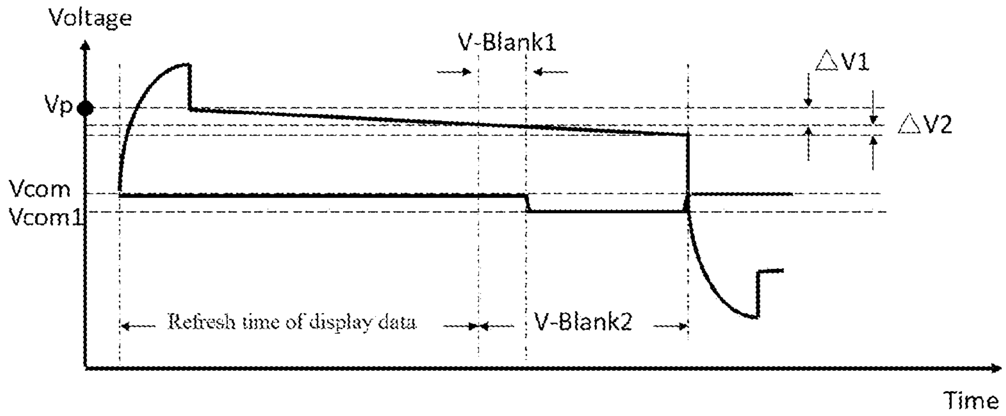
FIG. 3 illustrates a schematic diagram of change of a pixel voltage and the common voltage with time in a frame-inversion-driving-mode and a vertical change mode when the current frame image is displayed by the display device, if the current frame has a positive polarity according to the first embodiment of the present application.

As shown in FIG. 3, FIG. 3 exemplarily illustrates a schematic diagram of a change of the pixel voltage $V_p$ and the common voltage $V_{com}$ with time under the frame-inversion-driving-mode and the vertical-change-driving-mode when the current frame image is displayed on the display device, if the refresh frequency of the current frame image is less than the refresh frequency of the reference frame image, the second vertical blank interval is greater than the first vertical blank interval, and if the current frame image has the positive polarity, where $V_{com1}$ represents the target common voltage.

It should be understood that, when the refresh frequency of the current frame image is less than the refresh frequency of the reference frame image, and the second vertical blank interval is greater than the first vertical blank interval, when the current frame image is displayed on the display device, a curve reflecting the change of the pixel voltage $V_p$ and the common voltage $V_{com}$ of the pixels having the positive polarity with time under any one of the point-inversion-driving-mode, the row-inversion-driving-mode, the column-inversion-driving-mode and the line-one-and-line-two-inversion-driving mode, and under the vertical-change-driving-mode is the same as the curve of the V-Blank2 before the ending point, as shown in FIG. 3.

Figure 4:
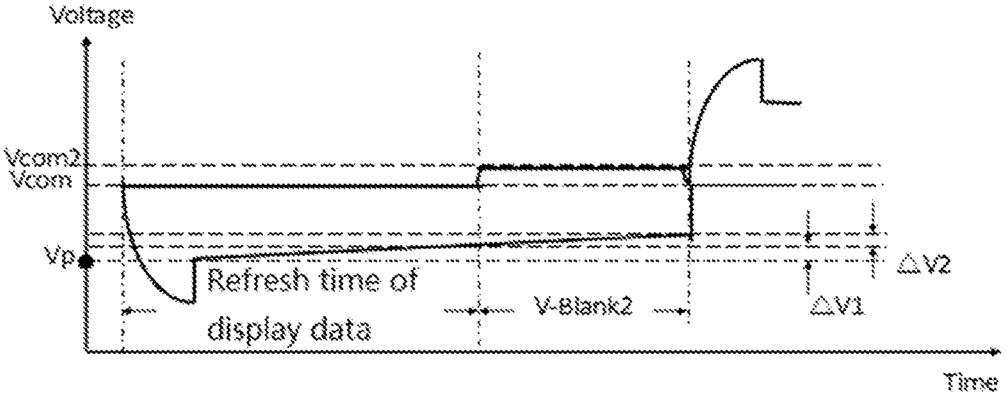
FIG. 4 illustrates a schematic diagram of change of the pixel voltage and the common voltage with time in the frame-inversion-driving-mode and the vertical change mode when the current frame image is displayed by the display device, if the current frame has a negative polarity according to the first embodiment of the present application.

As shown in FIG. 4, FIG. 4 exemplarily illustrates a schematic diagram of a change of the pixel voltage $V_p$ and the common voltage $V_{com}$ with time under the frame-inversion-driving-mode and the vertical-change-driving-mode when the current frame image is displayed on the display device, if the refresh frequency of the current frame image is less than the refresh frequency of the reference frame image, the second vertical blank interval is greater than the first vertical blank interval, and if the current frame image has the negative polarity, where $V_{com2}$ represents the target common voltage.

It should be understood that, if the refresh frequency of the current frame image is less than the refresh frequency of the reference frame image and the second vertical blank interval is greater than the first vertical blank interval, when the current frame image is displayed on the display device, a curve reflecting the change of the pixel voltage $V_p$ and the common voltage $V_{com}$ of the pixels having the negative polarity with time under any one of the point-inversion-driving-mode, the row-inversion-driving-mode, the column-inversion-driving-mode and the line-one-and-line-two-inversion-driving mode, and under the vertical-change-driving-mode is the same as the curve of the V-Blank2 before the ending point, as shown in FIG. 4.

Figure 5:
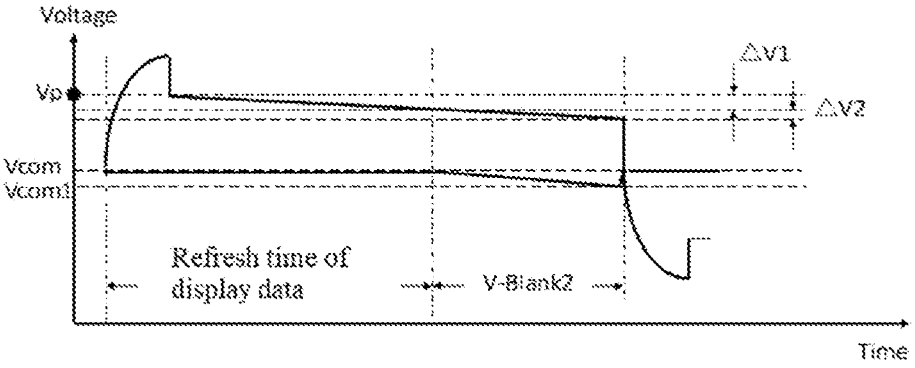
FIG. 5 illustrates a schematic diagram of change of the pixel voltage and the common voltage with time in the frame-inversion-driving-mode and the linear change mode when the current frame image is displayed by the display device, if the current frame has the positive polarity according to the first embodiment of the present application.

As shown in FIG. 5, FIG. 5 exemplarily illustrates a schematic diagram of a change of the pixel voltage $V_p$ and the common voltage $V_{com}$ with time under the frame-inversion-driving-mode and under the linear-change-driving-mode when the current frame image is displayed on the display device, if the refresh frequency of the current frame image is less than the refresh frequency of the reference frame image, the second vertical blank interval is greater than the first vertical blank interval, and if the current frame image has the positive polarity, where $V_{com1}$ represents the target common voltage.

It should be understood that, if the refresh frequency of the current frame image is less than the refresh frequency of the reference frame image and the second vertical blank interval is greater than the first vertical blank interval, when the current frame image is displayed on the display device, a curve reflecting the change of the pixel voltage $V_p$ and the common voltage $V_{com}$ of the pixels having the positive polarity with time under any one of the point-inversion-driving-mode, the row-inversion-driving-mode, the column-inversion-driving-mode and the line-one-and-line-two-inversion-driving mode, and under the linear-change-driving-mode is the same as the curve of the V-Blank2 before the ending point, as shown in FIG. 5.

Figure 6:
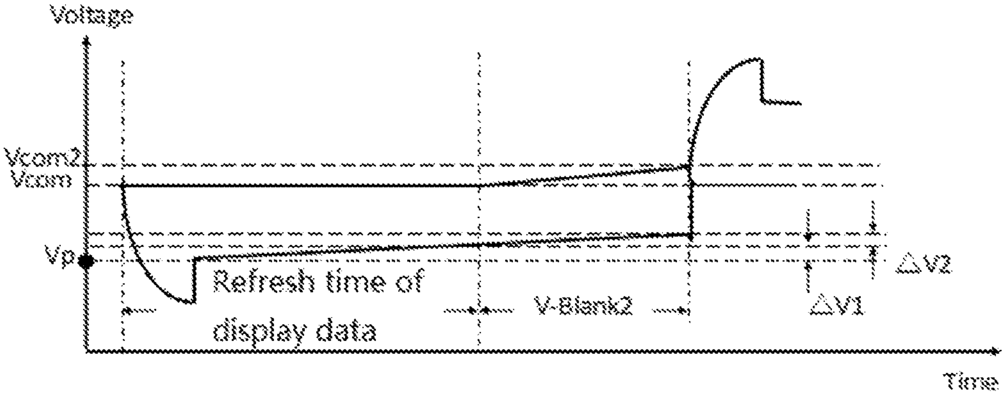
FIG. 6 illustrates a schematic diagram of change of the pixel voltage and the common voltage with time in the frame-inversion-driving-mode and the linear change mode when the current frame image is displayed by the display device, if the current frame has the negative polarity according to the first embodiment of the present application.

As shown in FIG. 6, FIG. 6 exemplarily illustrates a schematic diagram of a change of the pixel voltage $V_p$ and the common voltage $V_{com}$ with time under the frame-inversion-driving-mode and the linear-change-driving-mode when the current frame image is displayed on the display device, if the refresh frequency of the current frame image is less than the refresh frequency of the reference frame image, the second vertical blank interval is greater than the first vertical blank interval, and if the current frame image has the negative polarity, where $V_{com2}$ represents the target common voltage.

It should be understood that, if the refresh frequency of the current frame image is less than the refresh frequency of the reference frame image and the second vertical blank interval is greater than the first vertical blank interval, when the current frame image is displayed on the display device, a curve reflecting the change of the pixel voltage $V_p$ and the common voltage $V_{com}$ of the pixels having the negative polarity with time under any one of the point-inversion-driving-mode, the row-inversion-driving-mode, the column-inversion-driving-mode and the line-one-and-line-two-inversion-driving mode, and under the linear-change-driving-mode is the same as the curve of the V-Blank2 before the ending point, as shown in FIG. 6.

Figure 7:
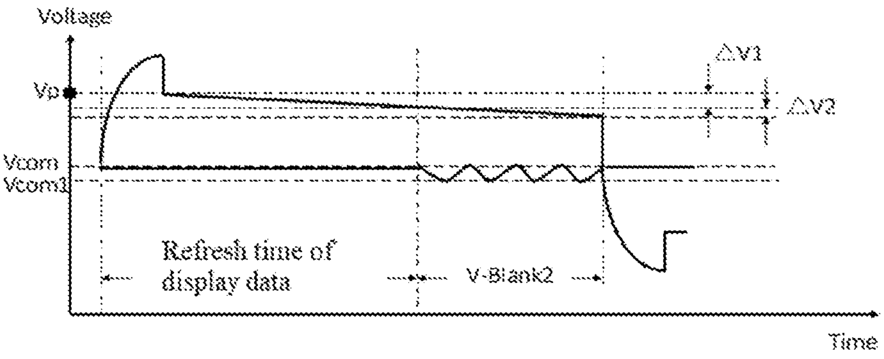
FIG. 7 illustrates a schematic diagram of change of the pixel voltage and the common voltage with time in the frame-inversion-driving-mode and an oscillation change mode when the current frame image is displayed by the display device, if the current frame has the positive polarity according to the first embodiment of the present application.

As shown in FIG. 7, FIG. 7 exemplarily illustrates a schematic diagram of a change of the pixel voltage $V_p$ and the common voltage $V_{com}$ with time under the frame-inversion-driving-mode and the oscillation-change-driving-mode when the current frame image is displayed on the display device, if the refresh frequency of the current frame image is less than the refresh frequency of the reference frame image, the second vertical blank interval is greater than the first vertical blank interval, and if the current frame image has the positive polarity, where $V_{com21}$ represents the target common voltage.

It should be understood that, if the refresh frequency of the current frame image is less than the refresh frequency of the reference frame image and the second vertical blank interval is greater than the first vertical blank interval, when the current frame image is displayed on the display device, a curve reflecting the change of the pixel voltage $V_p$ and the common voltage $V_{com}$ of the pixels having the positive polarity with time under any one of the point-inversion-driving-mode, the row-inversion-driving-mode, the column-inversion-driving-mode and the line-one-and-line-two-inversion-driving mode, and under the oscillation-change-driving-mode is the same as the curve of the V-Blank2 before the ending point, as shown in FIG. 7.

Figure 8:
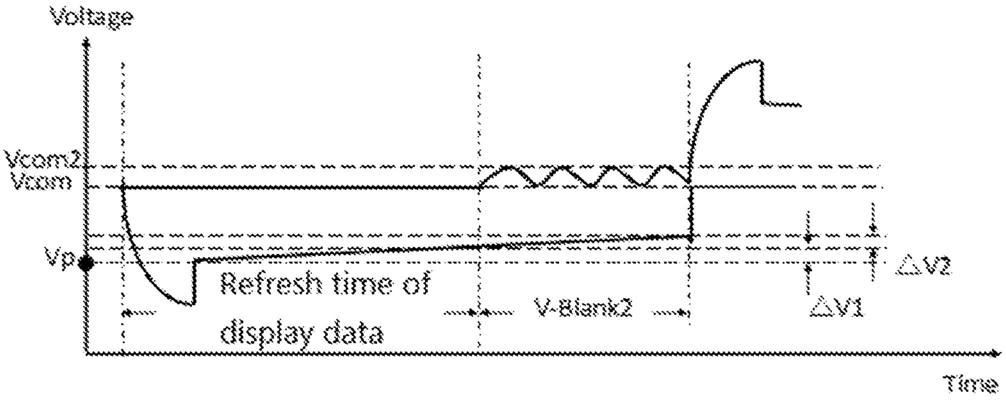
FIG. 8 illustrates a schematic diagram of change of the pixel voltage and the common voltage with time in the frame-inversion-driving-mode and the oscillation change mode when the current frame image is displayed by the display device, if the current frame has the negative polarity according to the first embodiment of the present application.

As shown in FIG. 8, FIG. 8 exemplarily illustrates a schematic diagram of a change of the pixel voltage $V_p$ and the common voltage $V_{com}$ with time under the frame-inversion-driving-mode and the oscillation-change-driving-mode when the current frame image is displayed on the display device, if the refresh frequency of the current frame image is less than the refresh frequency of the reference frame image, the second vertical blank interval is greater than the first vertical blank interval, and if the current frame image has the negative polarity, where $V_{com2}$ represents the target common voltage.

It should be understood that, if the refresh frequency of the current frame image is less than the refresh frequency of the reference frame image and the second vertical blank interval is greater than the first vertical blank interval, when the current frame image is displayed on the display device, a curve reflecting the change of the pixel voltage $V_p$ and the common voltage $V_{com}$ of the pixels having the negative polarity with time under any one of the point-inversion-driving-mode, the row-inversion-driving-mode, the column-inversion-driving-mode and the line-one-and-line-two-inversion-driving mode, and under the oscillation-change-driving-mode is the same as the curve of the V-Blank2 before the ending point, as shown in FIG. 8.

Figure 9:
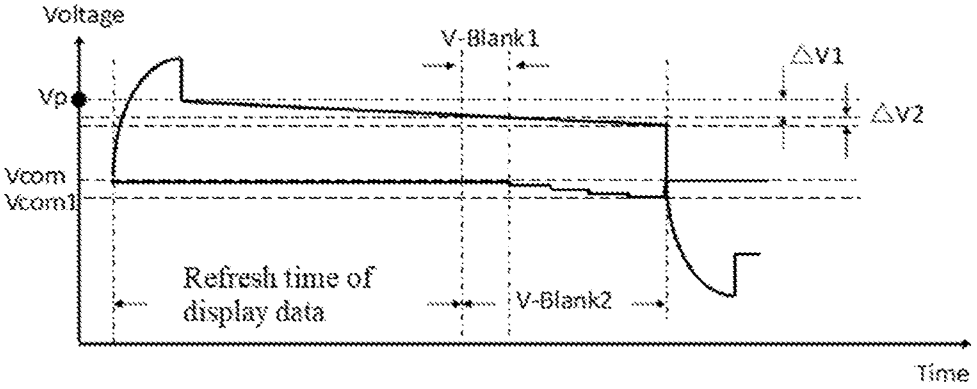
FIG. 9 illustrates a schematic diagram of change of the pixel voltage and the common voltage with time in the frame-inversion-driving-mode and a stepped change mode when the current frame image is displayed by the display device, if the current frame has the positive polarity according to the first embodiment of the present application.

As shown in FIG. 9, FIG. 9 exemplarily illustrates a schematic diagram of a change of the pixel voltage $V_p$ and the common voltage $V_{com}$ with time under the frame-inversion-driving-mode and the step-change-driving-mode when the current frame image is displayed on the display device, if the refresh frequency of the current frame image is less than the refresh frequency of the reference frame image, the second vertical blank interval is greater than the first vertical blank interval, and if the current frame image has the positive polarity, where $V_{com1}$ represents the target common voltage.

It should be understood that, if the refresh frequency of the current frame image is less than the refresh frequency of the reference frame image and the second vertical blank interval is greater than the first vertical blank interval, when the current frame image is displayed on the display device, a curve reflecting the change of the pixel voltage $V_p$ and the common voltage $V_{com}$ of the pixels having the positive polarity with time under any one of the point-inversion-driving-mode, the row-inversion-driving-mode, the column-inversion-driving-mode and the line-one-and-line-two-inversion-driving mode, and under the step-change-driving-mode is the same as the curve of the V-Blank2 before the ending point, as shown in FIG. 9.

Figure 10:
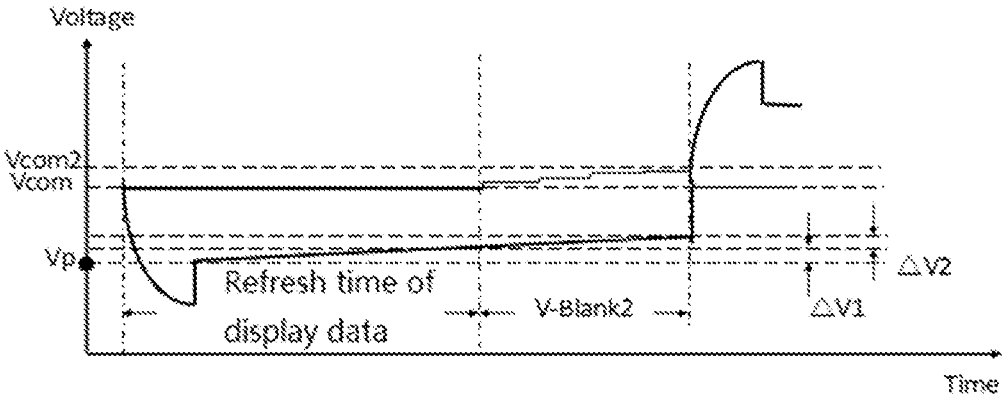
FIG. 10 illustrates a schematic diagram of change of the pixel voltage and the common voltage with time in the frame-inversion-driving-mode and the stepped change mode when the current frame image is displayed by the display device, if the current frame has the negative polarity according to the first embodiment of the present application.

As shown in FIG. 10, FIG. 10 exemplarily illustrates a schematic diagram of a change of the pixel voltage $V_p$ and the common voltage $V_{com}$ with time under the frame-inversion-driving-mode and the step-change-driving-mode when the current frame image is displayed on the display device, if the refresh frequency of the current frame image is less than the refresh frequency of the reference frame image, the second vertical blank interval is greater than the first vertical blank interval, and if the current frame image has the negative polarity, where $V_{com2}$ represents the target common voltage.

It should be understood that, if the refresh frequency of the current frame image is less than the refresh frequency of the reference frame image and the second vertical blank interval is greater than the first vertical blank interval, when the current frame image is displayed on the display device, a curve reflecting the change of the pixel voltage $V_p$ and the common voltage $V_{com}$ of the pixels having the negative polarity with time under any one of the point-inversion-driving-mode, the row-inversion-driving-mode, the column-inversion-driving-mode and the line-one-and-line-two-inversion-driving mode, and under the step-change-driving-mode is the same as the curve of the V-Blank2 before the ending point, as shown in FIG. 10.

Second Embodiment

Figure 11:
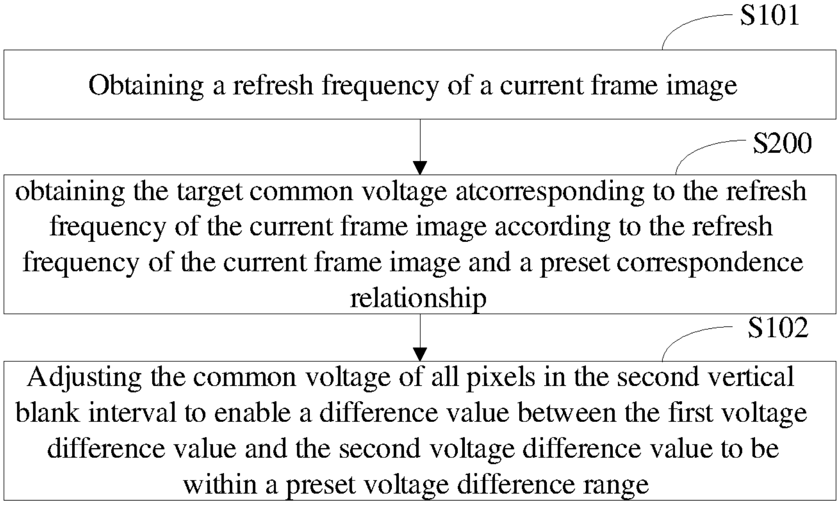
FIG. 11 illustrates a second schematic flowchart of a driving method provided by a second embodiment of the present application.

As shown in FIG. 11, in this embodiment, after the step S101 and before the step S102 in the first embodiment, the method further includes a following step S200:

At step S200, a target common voltage at a refresh frequency of a current frame image is obtained according to the refresh frequency of the current frame image and a preset correspondence relationship.

Where, the preset correspondence relationship is a correspondence relationship between preset refresh frequencies and target common voltages at the preset refresh frequencies.

In one embodiment, the vertical blank intervals of the display device at different refresh frequencies are also different, so that decrease levels of potentials of pixels are different, and the target common voltages of the display device at different refresh frequencies are also different; therefore, the target common voltages of the display device at a plurality of different preset refresh frequencies are detected in advance, then, the preset correspondence relationship between the plurality of different preset refresh frequencies and the target common voltages at the plurality of different preset refresh frequencies is established, so that the target common voltage at the refresh frequency of the current frame image can be quickly determined according to the refresh frequency of the current frame image and the preset corresponding relationship during a driving process of the display device.

In one embodiment, the number of the previously established preset correspondence relationships should be more enough to ensure that a preset refresh frequency being identical to the refresh frequency of the current frame image can be searched in all preset correspondence relationships, and the target common voltage corresponding to the preset refresh frequency being identical to the refresh frequency of the current frame image can be searched in the driving process of the display device.

In one embodiment, if the preset refresh frequency being identical to the refresh frequency of the current frame image cannot be searched in all preset correspondence relationships, a preset refresh frequency approximating the refresh frequency of the current frame image can be searched, and the target common voltage at the preset refresh frequency approximating the refresh frequency of the current frame image is used as the target common voltage at the refresh frequency of the current frame image. A preset refresh frequency approximating the refresh frequency of the current frame image may be a preset refresh frequency, where a difference value between this preset refresh frequency and the refresh frequency of the current frame image is within a preset refresh frequency range. The preset frequency range may be set according to the actual requirement, and a standard for setting the preset frequency range is that: when the target common voltage at the preset refresh frequency is taken as the target common voltage at the refresh frequency of the current frame image, the brightness of the image displayed by the display device does not change significantly, and thus there is no obvious screen flicker, where the difference value between the preset refresh frequency and the refresh frequency of the current frame image is within the preset frequency range.

In one embodiment, the preset correspondence relationship may be a mapping relationship, and may exist in a form of correspondence table, and the correspondence table may be a look-up table, the present correspondence relationship may also be in the form of outputting a corresponding search result by searching using other input data. By establishing the preset correspondence relationship in advance, the corresponding target common voltage can be quickly searched according to the refresh frequency of the current frame image, so that the computing resource and the execution time of the processor are effectively saved.

Figure 12:
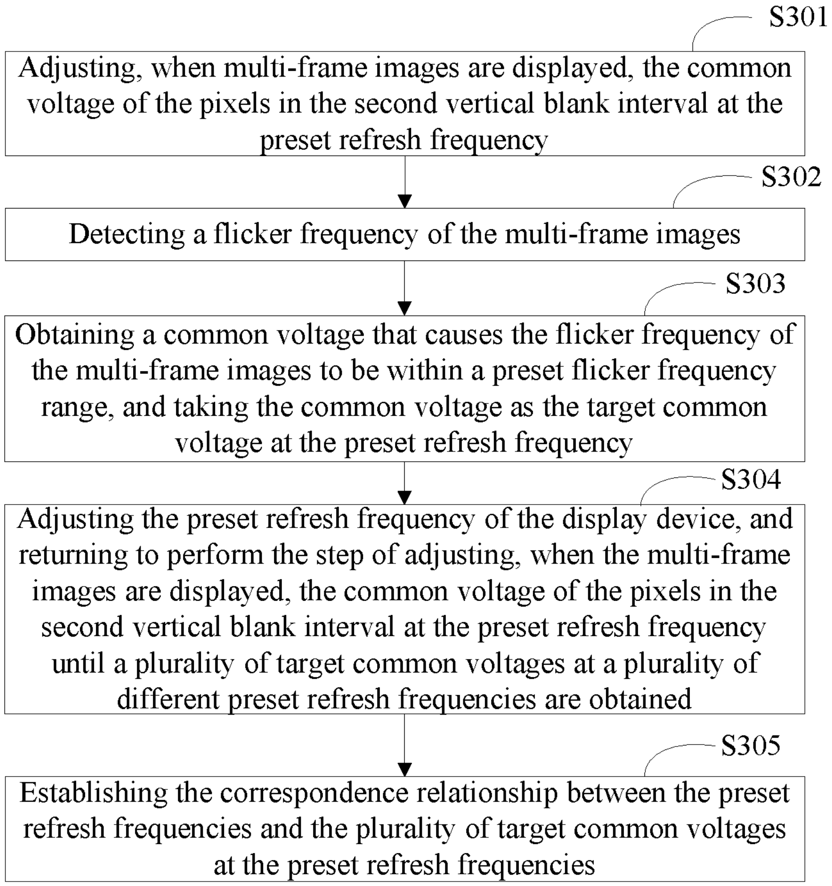
FIG. 12 illustrates a third schematic flowchart of the driving method provided by the second embodiment of the present application.

As shown in FIG. 12, an implementation method of establishing the preset correspondence relationship is exemplarily shown in FIG. 12, and the implementation method includes a step S301, a step S302, a step S303, a step S304 and a step S305 before the step S101, which are described below:

At step S301, the common voltage of all pixels in the second vertical blank interval is adjusted at a preset refresh frequency of the display device when multi-frame images are displayed.

At step S302, a flicker frequency of the multi-frame images is detected.

At step S303, the common voltage that causes the flicker frequency of the multi-frame images to be within a preset flicker frequency range is obtained and is taken as the target common voltage at the preset refresh frequency of the display device.

At step S304, the preset refresh frequency is adjusted, the step S301 is returned back and the step of adjusting the common voltage of the pixels in the second vertical blank interval at the preset refresh frequency of the display device is performed until a plurality of target common voltages at a plurality of different preset refresh frequencies are obtained;

At step S305, the correspondence relationship between the plurality of preset refresh frequencies and the plurality of target common voltages at the plurality of preset refresh frequencies is established.

In one embodiment, firstly, at the preset refresh frequency of the display device, the common voltage of all pixels in the second vertical blank interval is continuously adjusted when the multi-frame images are displayed on the display device, and the flicker frequency of the multi-frame images (i.e., a brightness change condition) is detected, and the common voltage that causes the flicker frequency of the multi-frame images to be within the preset flicker frequency range is taken as the target common voltage at the preset refresh frequency of the display device; then, the preset refresh frequency is adjusted, and the steps S301, the step S302 and the step S303 are repeatedly performed until the plurality of target common voltages at a sufficient number of different preset refresh frequencies is obtained; finally, a correspondence relationship between the preset refresh frequencies and the target common voltages at the preset refresh frequencies are established.

In one embodiment, the preset flicker frequency range may be set according to the actual requirement, and the standard for setting the preset flicker frequency range is that: when the common voltage of all pixels of the display device in the second vertical blank interval is adjusted as the target common voltage at the preset refresh frequency, there is no obvious screen flicker of the multi-frame images displayed by the display device.

It should be understood that, the values of serial numbers of the steps in the aforesaid embodiments do not indicate an order of execution sequences of the steps; instead, the execution sequences of the steps should be determined by functionalities and internal logic of the steps, and thus shouldn't be regarded as limitation to an implementation process of the embodiment of the present application.

Third Embodiment

Figure 13:
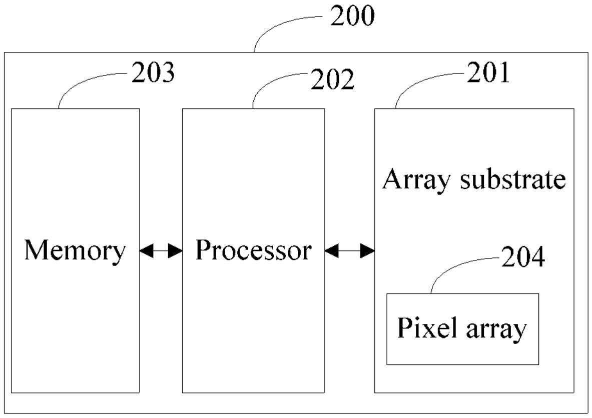
FIG. 13 illustrates a schematic structural diagram of a display device provided by a third embodiment of the present application.

As shown in FIG. 13, a display device 200 is provided in the third embodiment of the present application, the display device 200 includes an array substrate 201, at least one processor 202 (only one processor shown in FIG. 13), a memory 203, and a computer program stored in the memory 203 and executable by the at least one processor 202. The array substrate 201 includes a pixel array 204, when executing the computer program, the processor 202 is configured to implement the steps in any one of the methods for driving the display device in the method embodiments.

In one embodiment, the display device may include but is not limited to the array substrate, the processor, and the memory. A person of ordinary skill in the art may understand that, FIG. 13 is only one example of the display device 200, but should not be constituted as limitation to the display device 200, the display device 500 may include more or less components than the components shown in FIG. 13; as an alternative, the display device 500 may combine some components or different components; for example, the display device 200 may also include an input and output device, a network access device, etc.

In one embodiment, the display device 200 may be a TFT-LCD (Thin Film Transistor Liquid Crystal Display) display device, a LCD (Liquid Crystal Display) display device, an OLED (Organic Light Emitting Diode) display device, a QLED (Quantum Dot Light Emitting Diode) display device, or the like.

In one embodiment, the processor may be CPU (Central Processing Unit), and may also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. For example, the processor may be a TCON (Timing Controller). The general purpose processor may be a microprocessor, as an alternative, the processor may also be any conventional processor, or the like.

In one embodiment, in some embodiments, the memory may be an internal storage unit of the display device, such as a hard disk or a memory of the display device. In some other embodiments, the memory may also be an external storage device of the display device, such as a plug-in hard disk, a SMC (Smart Media Card), a SD (Secure Digital) card, a FC (Flash Card) equipped on the display device. Furthermore, the memory may not only include the internal storage unit of the display device but also include the external memory of the display device. The memory is configured to store operating system, application programs, Boot Loader, data and other procedures such as program codes of the computer program. The memory may also be configured to store data that has been output or being ready to be output temporarily.

A computer readable storage medium is further provided in one embodiment of the present application, the computer readable storage medium stores a computer program, that, when executed by the timing controller, implements the steps in the various embodiments of the method for driving the display device.

In the aforesaid embodiments, the descriptions of the various embodiments are emphasized respectively, regarding a part of one embodiment which has not been described or disclosed in detail, reference can be made to relevant descriptions in other embodiments.

The various embodiments described above are merely used to explain the technical solutions of the present application, and are not intended to limit the technical solutions of the present application. Although the present application has been described in detail with reference to the embodiments described above, one of ordinary skill in the art should understand that the technical solutions described in these embodiments can still be modified, or some or all technical features in the embodiments can be equivalently replaced; however, these modifications or replacements do not make the essences of corresponding technical solutions to break away from the spirit and the scope of the technical solutions of the various embodiments of the present application, and thus should all be included in the protection scope of the present application.

What is claimed is:

1. A method for driving a display device, comprising:

obtaining a refresh frequency of a current frame image; and adjusting a common voltage of all pixels in a second vertical blank interval to control a difference value between a first voltage difference and a second voltage difference to be within a preset-voltage-difference-range if the refresh frequency of the current frame image is different from a refresh frequency of a reference frame image, the preset-voltage-difference-range is equivalently replaced with a single ideal value 0;

wherein the first voltage difference is a root mean square of m difference values between m common voltages and m pixel voltages of the pixels obtained at m time points in a first vertical blank interval when the reference frame image is displayed on the display device; the second voltage difference is a root mean square of n difference values between n common voltages and n pixel voltages of the pixels obtained at n time points in the second vertical blank interval when the current frame image is displayed on the display device;

wherein when the reference frame image is displayed by the display device a vertical blank interval of the display device is defined as the first vertical blank interval; when the current frame image is displayed by the display device, the vertical blank interval of the display device is defined as the second vertical blank interval.

2. The method according to claim 1, wherein said adjusting the common voltage of the pixels in the second vertical blank interval comprises:

adjusting the common voltage of the pixels in the second vertical blank interval in a vertical change manner, so that the common voltage changes vertically;

or adjusting the common voltage of the pixels in the second vertical blank interval in a linear change manner, so that the common voltage changes linearly in the second vertical blank interval;

or adjusting the common voltage of the pixels in the second vertical blank interval in an oscillation change manner, so that the common voltage changes in the oscillation change manner in the second vertical blank interval;

or adjusting the common voltage of the pixels in the second vertical blank interval in a step change manner, so that the common voltage changes in the step change manner in the second vertical blank interval.

3. The method according to claim 1, wherein the refresh frequency of the current frame image is less than the refresh frequency of the reference frame image, and the second vertical blank interval is greater than the first vertical blank interval; and said adjusting the common voltage of the pixels in the second vertical blank interval comprises:

in a frame-inversion-driving-mode, reducing the common voltage of the pixels in the second vertical blank interval if the current frame has a positive polarity; boosting the common voltage of all the pixels in the second vertical blank interval if the current frame has a negative polarity;

in a point-inversion-driving-mode, reducing the common voltage of the pixels having the positive polarity in the second vertical blank interval, and boosting the common voltage of the pixels with the negative polarity in the second vertical blank interval;

in a row-inversion-driving-mode, reducing the common voltage of row pixels having the positive polarity in the second vertical blank interval, and boosting the common voltage of row pixels having the negative polarity in the second vertical blank interval;

in a column-inversion-driving-mode, reducing the common voltage of column pixels having the positive polarity in the second vertical blank interval, and boosting the common voltage of column pixels having the negative polarity in the second vertical blank interval; and in a line-one-and-line-two-inversion-driving-mode, reducing the common voltage of the pixels having the positive polarity in the second vertical blank interval, and boosting the common voltage of the pixels having the negative polarity in the second vertical blank interval.

4. The method according to claim 1, wherein the refresh frequency of the current frame image is greater than the refresh frequency of the reference frame image, and the second vertical blank interval is smaller than the first vertical blank interval;

said adjusting the common voltage of all the pixels in the second vertical blank interval comprises:

in a frame-inversion-driving-mode, boosting the common voltage of the pixels in the second vertical blank interval if the current frame has the positive polarity; reducing the common voltage of the pixels in the second vertical blank interval if the current frame has the negative polarity;

in a point-inversion-driving-mode, boosting the common voltage of the pixels having the positive polarity in the second vertical blank interval, and reducing the common voltage of the pixels having the negative polarity in the second vertical blank interval;

in a row-inversion-driving-mode, boosting the common voltage of row pixels having the positive polarity in the second vertical blank interval, and boosting the common voltage of row pixels having the negative polarity in the second vertical blank interval is reduced;

in a column-inversion-driving-mode, boosting the common voltage of column pixels having the positive polarity in the second vertical blank interval, and reducing the common voltage of column pixels having the negative polarity in the second vertical blank interval; and in a line-one-and-line-two-inversion-driving-mode, boosting the common voltage of the pixels having the positive polarity in the second vertical blank interval, and reducing the common voltage of the pixels having the negative polarity in the second vertical blank interval.

5. The method according to claim 1, wherein the reference frame image is a previous frame image.

6. The method according to claim 1, wherein an adjustment range of the common voltage is between an initial common voltage and a target common voltage, a difference value between the initial common voltage and the target common voltage is equal to a third voltage difference, wherein the third voltage difference is a voltage difference between an initial pixel voltage and a pixel voltage at an ending point of the second vertical blank interval.

7. The method according to claim 6, wherein after said obtaining the refresh frequency of the current frame image, the method further comprises:

obtaining the target common voltage corresponding to the refresh frequency of the current frame image according to the refresh frequency of the current frame image and a preset correspondence relationship;

wherein the preset correspondence relationship is a correspondence relationship between a plurality of preset refresh frequencies and a plurality of target common voltages at the plurality of preset refresh frequencies.

8. The method according to claim 7, wherein before said obtaining the refresh frequency of the current frame image, the method further comprises:

adjusting, when multi-frame images are displayed on the display device, the common voltage of the pixels in the second vertical blank interval at the preset refresh frequency of the display device;

detecting a flicker frequency of the multi-frame images;

obtaining a common voltage that causes the flicker frequency of the multi-frame images to be within a preset flicker frequency range, and taking the common voltage that causes the flicker frequency of the multi-frame images to be within the preset flicker frequency range as the target common voltage at the preset refresh frequency of the display device;

adjusting the preset refresh frequency of the display device, and returning to perform the step of adjusting, when the multi-frame images are displayed on the display device, the common voltage of the pixels in the second vertical blank interval at the preset refresh frequency of the display device so as to obtain the plurality of target common voltages at the plurality of different preset refresh frequencies; and establishing the correspondence relationship between the plurality of different preset refresh frequencies and the plurality of target common voltages at the plurality of different preset refresh frequencies.

9. A display device, comprising an array substrate, a memory, a processor and a computer program stored in the memory and executable by the processor, wherein the array substrate comprises a pixel array, and the processor is configured to, when executing the computer program, implement steps of a method for driving the display device, comprising:

obtaining a refresh frequency of a current frame image; and adjusting a common voltage of all pixels in a second vertical blank interval to control a difference value between a first voltage difference and a second voltage difference to be within a preset-voltage-difference-range if the refresh frequency of the current frame image is different from a refresh frequency of a reference frame image, the preset-voltage-difference-range is equivalently replaced with a single ideal value 0;

wherein the first voltage difference is a root mean square of m difference values between m common voltages and m pixel voltages of the pixels obtained at m time points in a first vertical blank interval when the reference frame image is displayed on the display device; the second voltage difference is a root mean square of n difference values between n common voltages and n pixel voltages of the pixels obtained at n time points in the second vertical blank interval when the current frame image is displayed on the display device;

wherein when the reference frame image is displayed by the display device a vertical blank interval of the display device is defined as the first vertical blank interval; when the current frame image is displayed by the display device, the vertical blank interval of the display device is defined as the second vertical blank interval.

10. The display device according to claim 9, wherein the processor is further configured to implement the step of adjusting the common voltage of the pixels in the second vertical blank interval by:

adjusting the common voltage of the pixels in the second vertical blank interval in a vertical change manner, so that the common voltage changes vertically;

or adjusting the common voltage of the pixels in the second vertical blank interval in a linear change manner, so that the common voltage changes linearly in the second vertical blank interval;

or adjusting the common voltage of the pixels in the second vertical blank interval in an oscillation change manner, so that the common voltage changes in the oscillation change manner in the second vertical blank interval;

or adjusting the common voltage of the pixels in the second vertical blank interval in a step change manner, so that the common voltage changes in the step change manner in the second vertical blank interval.

11. The display device according to claim 9, wherein the refresh frequency of the current frame image is less than the refresh frequency of the reference frame image, and the second vertical blank interval is greater than the first vertical blank interval;

the processor is further configured to implement the step of adjusting the common voltage of the pixels in the second vertical blank interval by:

in a frame-inversion-driving-mode, reducing the common voltage of the pixels in the second vertical blank interval if the current frame has a positive polarity; boosting the common voltage of all the pixels in the second vertical blank interval if the current frame has a negative polarity;

in a point-inversion-driving-mode, reducing the common voltage of the pixels having the positive polarity in the second vertical blank interval, and boosting the common voltage of the pixels with the negative polarity in the second vertical blank interval;

in a row-inversion-driving-mode, reducing the common voltage of row pixels having the positive polarity in the second vertical blank interval, and boosting the common voltage of row pixels having the negative polarity in the second vertical blank interval;

in a column-inversion-driving-mode, reducing the common voltage of column pixels having the positive polarity in the second vertical blank interval, and boosting the common voltage of column pixels having the negative polarity in the second vertical blank interval; and in a line-one-and-line-two-inversion-driving-mode, reducing the common voltage of the pixels having the positive polarity in the second vertical blank interval, and boosting the common voltage of the pixels having the negative polarity in the second vertical blank interval.

12. The display device according to claim 9, wherein the refresh frequency of the current frame image is greater than the refresh frequency of the reference frame image, and the second vertical blank interval is smaller than the first vertical blank interval;

the processor is further configured to implement the step of adjusting the common voltage of all the pixels in the second vertical blank interval by:

in a frame-inversion-driving-mode, boosting the common voltage of the pixels in the second vertical blank interval if the current frame has the positive polarity; reducing the common voltage of the pixels in the second vertical blank interval if the current frame has the negative polarity;

in a point-inversion-driving-mode, boosting the common voltage of the pixels having the positive polarity in the second vertical blank interval, and reducing the common voltage of the pixels having the negative polarity in the second vertical blank interval;

in a row-inversion-driving-mode, boosting the common voltage of row pixels having the positive polarity in the second vertical blank interval, and boosting the common voltage of row pixels having the negative polarity in the second vertical blank interval is reduced;

in a column-inversion-driving-mode, boosting the common voltage of column pixels having the positive polarity in the second vertical blank interval, and reducing the common voltage of column pixels having the negative polarity in the second vertical blank interval; and in a line-one-and-line-two-inversion-driving-mode, boosting the common voltage of the pixels having the positive polarity in the second vertical blank interval, and reducing the common voltage of the pixels having the negative polarity in the second vertical blank interval.

13. The display device according to claim 9, wherein the reference frame image is a previous frame image.

14. The display device according to claim 9, wherein an adjustment range of the common voltage is between an initial common voltage and a target common voltage, a difference value between the initial common voltage and the target common voltage is equal to a third voltage difference, wherein the third voltage difference is a voltage difference between an initial pixel voltage and a pixel voltage at an ending point of the second vertical blank interval.

15. The display device according to claim 14, wherein after the step of obtaining the refresh frequency of the current frame image, the processor is further configured to perform a step of:

obtaining the target common voltage corresponding to the refresh frequency of the current frame image according to the refresh frequency of the current frame image and a preset correspondence relationship;

wherein the preset correspondence relationship is a correspondence relationship between a plurality of preset refresh frequencies and a plurality of target common voltages at the plurality of preset refresh frequencies.

16. The display device according to claim 14, wherein before the step of obtaining the refresh frequency of the current frame image, the processor is further configured to perform following steps of:

adjusting, when multi-frame images are displayed on the display device, the common voltage of the pixels in the second vertical blank interval at the preset refresh frequency of the display device;

detecting a flicker frequency of the multi-frame images;

obtaining a common voltage that causes the flicker frequency of the multi-frame images to be within a preset flicker frequency range, and taking the common voltage that causes the flicker frequency of the multi-frame images to be within the preset flicker frequency range as the target common voltage at the preset refresh frequency of the display device;

adjusting the preset refresh frequency of the display device, and returning to perform the step of adjusting, when the multi-frame images are displayed on the display device, the common voltage of the pixels in the second vertical blank interval at the preset refresh frequency of the display device so as to obtain a plurality of target common voltages at a plurality of different preset refresh frequencies; and establishing the correspondence relationship between the different preset refresh frequencies and the plurality of target common voltages at the different preset refresh frequencies.

* * * * *